June 11, 1957  E. G. JOHNSON  2,795,750
ALTERNATING CURRENT MACHINERY
Filed Dec. 26, 1950  3 Sheets-Sheet 3
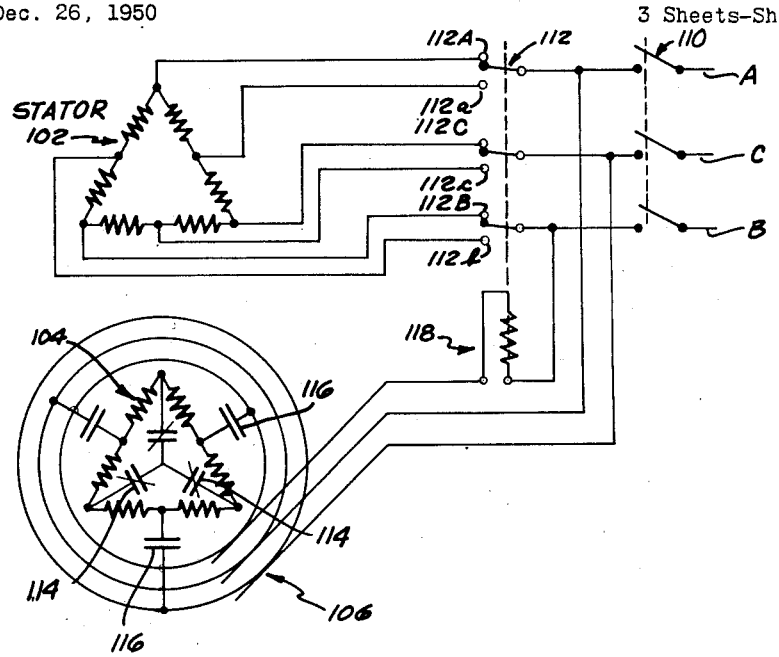
FIG_3
INVENTOR.
Ervin G. Johnson
BY
Paul Bliven United States Patent Office 2,795,750
Patented June 11, 1957

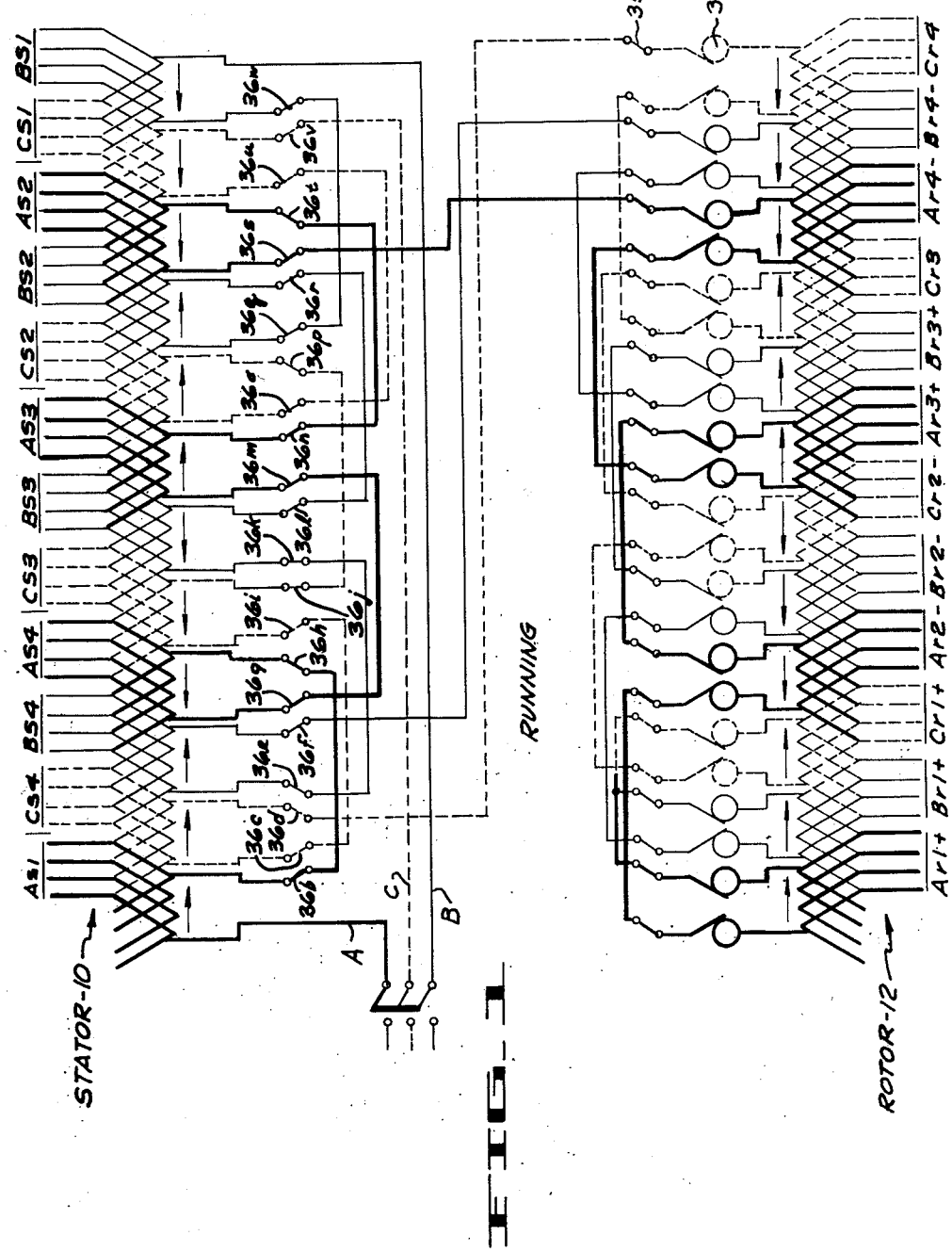

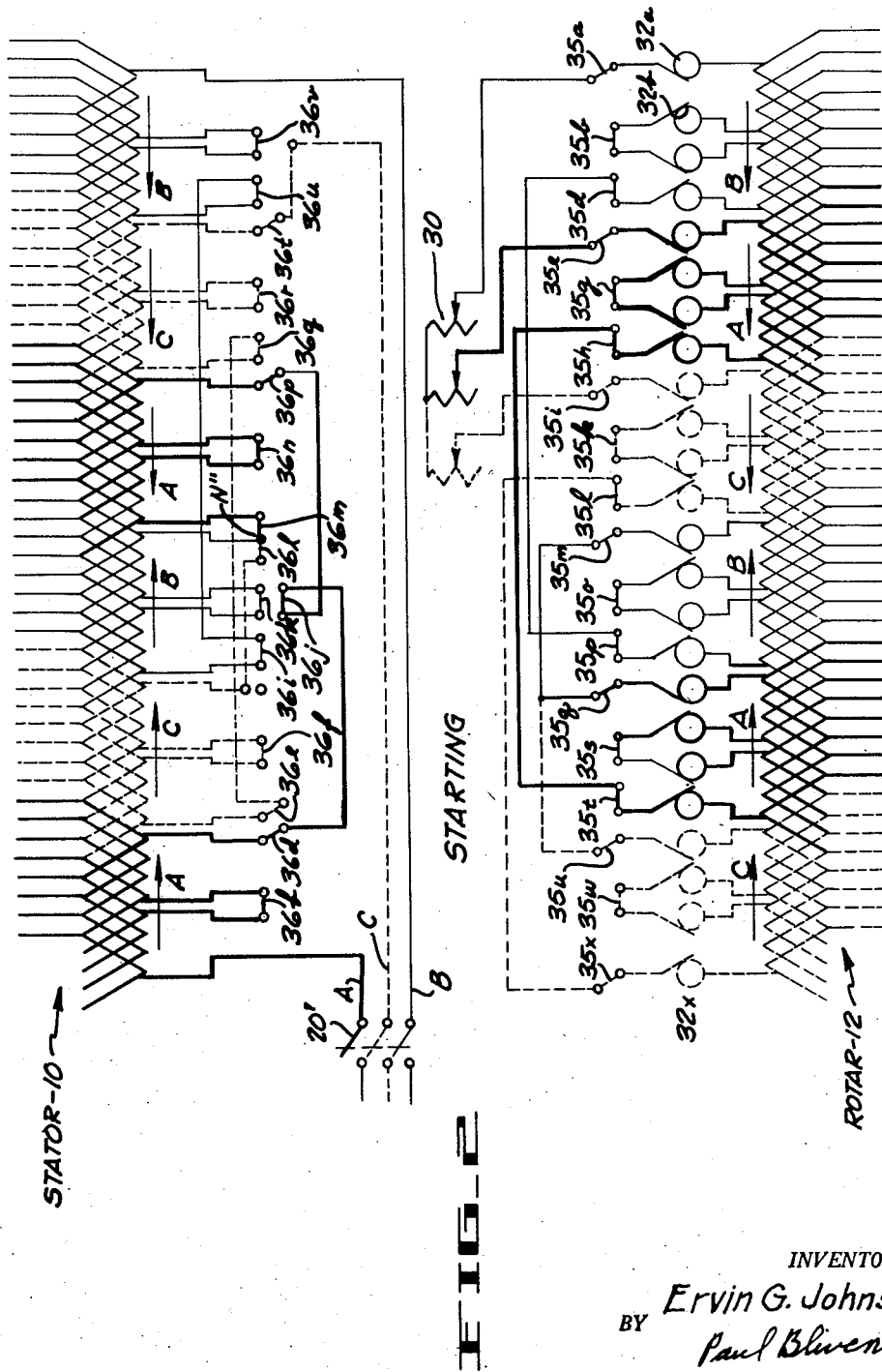

2,795,750

ALTERNATING CURRENT MACHINERY

Ervin G. Johnson, Oakland, Calif.; Eleanor De Haas Johnson, executrix of said Ervin G. Johnson, deceased Application December 26, 1950, Serial No. 202,621

12 Claims. (Cl. 318—197)

This invention relates to electrical alternating current synchronous machinery, and particularly to such machinery including motors and generators whereby electrical and mechanical energy of periodic and oscillating qualities is interchanged for utilization in forms suitable for the occasion.

Synchronous machinery generally employs current in two forms, alternating and direct. Usually the direct current is applied to produce unidirectional magnetic flux which, in a common form of motor and generator, occurs in the rotor field. In the case of synchronous motors the flux so produced locks the rotor in step with the rotating field of the stator while in the synchronous generator the direct current produced field of the rotor induces in the stator windings alternating voltages of frequencies fixed by the speed at which the prime mover operates.

It is one of the main objects of my invention to provide a synchronous machine which requires only windings which carry alternating current in effecting the interchange of mechanical and electrical energy in a motor. It is another object of this invention to provide a constant speed motor having a speed precisely double that of synchronous motors provided with a direct current produced field, the two motors having the same number of poles.

It is another object of my invention to provide a system of starting constant speed motors employing electrically distinct starting and running power whereby power may be applied continuously from zero speed through the transition and to running from a main source of power.

It is another object of my invention to provide a self-starting doubly-synchronous-speed motor.

It is a further object of my invention to provide a motor of a speed which is locked in respect of the frequency of the power supply, which is capable of operation solely from alternating current supply; which is capable of operation at two doubly-synchronous speeds as respects the speeds of machines having like numbers of poles; and which is capable of operation at slip-frequency speeds as a wound rotor induction motor.

It is a further object of my invention to provide, by the utilization of the principles herein set forth, an electrical equivalent of mechanical gear speed changers, such as multiple speed ratio gear boxes, while also providing a frequency multiplier and exchanger.

Other objects and advantages of my invention will become apparent from a consideration of the following specification in connection with the accompanying drawings, in which:

Figures 1 and 2 are wiring diagrams of the starting and running connections of one embodiment of my invention; and Figure 3 illustrates another embodiment.

Referring to Figures 1 and 2, the apparatus comprises a conventional three-phase wound stator 10 and a similarly wound three-phase rotor 12. The time-phase order is regarded as A, B, C. The circuit of phase A is shown in a relatively continuous line; that of phase B is in a relatively light continuous line; and that of phase C is in a dotted line, to facilitate tracing of circuits and comparison of polarities produced at any instant. The coils are fragmentarily shown in conventional manner to avoid confusion in the appearance of the illustration. As viewed in Figures 1 and 2, the stator windings are regarded as seen from the axis of the machine, rolled out flat; and the rotor windings are regarded as seen looking radially inward toward the axis of the machine.

In Figure 1 the pole groups of the stator are identified by the characters $As1$, $Bs1$, etc., in which the letters A, B, C identify phases; "$s$" identifies the coil as being of the stator; and the numerals 1, 2, 3 and 4 identify the serial order of the pole groups preceding around the stator in one direction; while the odd and even numbered poles are regarded at one instant as being of opposite polarities. The pole groups of the rotor are similarly designated, being distinguished by the letter "$r$" rather than "$s$." The stator and rotor windings are illustrated displaced axially so that the windings may not be confused in appearance but it will be understood that the stator and rotor coils are in radial correlation in the usual manner, there being only a slight air gap between the coils of the stator and the rotor, as is conventional. It is to be pointed out, however, that the air gap can be relatively great as compared with purely induction machines, because the magnetomotive forces of any coradial pair of stator and rotor coils are always additive and thus considerably avoid leakage in the air gap.

Referring to coils $As1$, $Bs1$ and $Cs1$, it will be appreciated that the progress of the maximum intensity of the magnetic field produced by them as respects the space time relation, is in the direction of their space and time serial disposition, that is, from right to left in Figure 1. This shift of magnetic field simultaneously occurs also in coils $As2$, $Bs2$, and $Cs2$, although the polarity is opposite of the preceding mentioned groups. Corresponding simultaneous shifts occur in groups $As3$, $Bs3$, and $Cs3$, and in groups $As4$, $Bs4$, and $Cs4$, respectively.

As shown, the motor is connected for self starting directly from alternating sources of fixed frequency, such as lines A, B, C. In Figure 1, the stator and rotor pole groups of coils are shown connected for running operation. In Figure 2, the stator and rotor coils are shown as connected for starting. Figures 1 and 2 can be superimposed to show the changes occurring in shifting from one to the other. In starting, the stator and rotor are connected as a two-pole wound rotor induction motor. The synchronous speed of the motor when so connected to 60 cycle current is 3600 revolutions per minute, so that at a slip of five percent the rotor turns at about 3420 R. P. M. From this speed the change from Figure 2 arrangement is effected to the Figure 1 connections and the rotor speed increases to 3600 R. P. M. In Figure 2, a conventional wound rotor induction motor starting resistance 30 is provided and a common connection at N' provides for operation of the resistor 30 and the rotor windings as a Y connected generator and load. The connection of the stator provides a common connection to the stator windings at N" so that the stator operates in Y also. Polar progression is right to left in the stator. Rotation of the rotor is, accordingly, from right to left. The two terminals of each rotor pole group are connected through individual slip rings $32a$, $32b$ . . . $32x$ and brushes to external switches $35a$, $35b$ . . . $35x$. The stator has similar switches $36b$, $36d$ . . . $36v$. These switches effect the change from the starting condition of Figure 2 to the running condition of Figure 1, including the interconnection of stator and rotor as shown in Figure 1.

Figures 1 and 2 show both stators and rotors having their respective phase windings connected in series Y, or star. It will be appreciated that the corressponding phases of the stator and rotor may be connected in parallel Y or delta, or combinations of Y and delta, series or parallel. With the parallel connections, it is possible to vary the relative amounts of currents in the rotor and stator windings and thus to distribute the losses by heating, etc., to the best effect.

In Figure 3 of the drawings there are generally indicated a three-phase stator winding 102, a three phase rotor winding 104, a collector ring and brush assembly 106, a source of three phase alternating current 108, a supply switch 110, a stator winding energization switch 112, rotor winding connections switches 114 and 116, an automatically responsive start-run relay 118, and suitable conductors interconnecting these devices as shown.

The stator and rotor windings are wound similarly to the windings of multiple speed wound rotor induction motor windings, which include connections whereby the windings produce numbers of poles in the ratio of two to one. In the multiple speed motors of this type both the rotor and the stator windings have equal numbers of poles under each speed of operation. This change in numbers of poles includes a change from a large number of poles corresponding to the slower speed of operation to a smaller number of poles for a higher speed of operation; and this change is effected usually by producing what are known as consequent poles, through reversing the relative flow of current in one of each two cooperating coils normally operating in north and south relation. Thus, at all instants the coil polarities in the air gap are alike when consequent pole operation occurs, and opposite polarities are consequently produced in the regions between adjacent coils.

In the motor here described changes in numbers of poles in the windings are made for the purposes of starting a motor under load to run very near to constant speed and to enable the motor to run at such constant speed after a starting period.

The involved steps include connecting the windings of the stator and rotor so that they operate as a wound rotor induction motor in the starting phase, and when the maximum speed is attained under these conditions the windings are reconnected so that the numbers of poles on both the stator and the rotor are doubled, the stator and rotor now being both directly energized from the source of three-phase supply, and the directions of rotation of the magnetic fields in the stator and rotor being opposite in sense of rotation with respect to the windings in which they occur. Thus, when looking toward one end of the motor shaft the direction of rotation of the magnetic field of the stator is clockwise with relation to the stator, and the direction of rotation of the magnetic field of the rotor is counterclockwise with respect to the rotor. However, the rotation of the stator field is locked in with the rotation of the stator field, so actually the rotation of the rotor field with respect to the stator is clockwise.

Referring to Figure 3 again, the rotor winding 104 has associated therewith a group of starting switches 114 which are closed during starting and open during full speed operation and a group of running switches 116 which are open during starting and closed during running. The switches 114 connect the windings 104 together in such a manner that the rotor presents a number of north and south magnetic poles "$n$" during starting. The switches 116 connect the windings 104 to a three phase supply so that two times "$n$" poles are produced by the winding 104.

Upon closing the switch 110, the switches 112 being in positions contacting terminals 112A, 112B, and 112C, the stator windings 102 are energized to produce a number of poles "$n$" having rotation in, say, the clockwise direction. The rotor winding 104, being short-circuited and presenting the "$n$" poles, accelerates by induction, driving its load to a speed which is usually in the order of from 95% to 97% of the rotary speed of the stator's magnetic field.

When such a speed is reached, the switches 114 and 116 are, respectively, opened and closed and the switch 112 is reversed at the same time with the result that the stator's windings 102 now present two times "$n$" poles with the magnetic field rotating in the same clockwise direction but at only exactly half its previous speed of rotation. The closure of switches 116 produces "$2n$" poles on the rotor resulting in a magnetic field having a counterclockwise rotational speed with respect to the rotor shaft which is exactly equal to the clockwise speed of the magnetic field of the stator. The fields of the rotor and the stator are, therefore, at transition of switching, rotating in the same clockwise direction in space at nearly the same speeds, the slip of the rotor causing the rotor magnetic field to tend to lag behind. However, the two magnetic fields lock together, forcing the rotor itself to momentarily accelerate to a position where the stator and rotor fields remain continuously in alignment.

The switches 112, 114, 116 can be speed responsive, that is, responsive to the rotor speed, or they can be manually changed over. In order to minimize the number of collector rings, the rotor may have the switches 114 mounted thereon. Switches 116 may, also, be mounted on the rotor, and both switches 114 and 116 may be actuated at the proper speed by centrifugal force. Only two of switches 114 and two of switches 116 are theoretically necessary.

The relay coil 118 may be provided for automatically responding to the flow of current resulting from closure of switches 116 in closing the rotor circuits for running operation, to change the switch 112 to contacts 112a, 112b, and 112c, the running condition for the stator windings.

By means of the apparatus described above, synchronous operation of a plural phase motor is achieved with a minimum of starting and control equipment such as resistors, switches, etc., and the motor is operable asynchronously at two nominal speeds of its stator fields, and at an additional speed synchronously. The operation of such a motor synchronously has proven to increase both the power factor and the efficiency substantially over the corresponding values for its operation as an asynchronous motor with the same number of poles. Moreover, the pull-out torque of the motor is substantially increased when operated as a synchronous motor as compared to the same motor when its is operated as a wound rotor induction motor. An additional advantage of synchronous operation is that the motor may be designed with a substantial air gap between the rotor and stator cores, so that there is less possibility of the rotor scraping on the stator due to wear in the bearings.

A notable characteristic of the motor when operated synchronously is that it developes more than twice as much power when it is operated on, for example, two poles synchronously as it does when it is operated on two poles as a wound rotor induction motor. This follows analytically directly from the fact that the rotor speed is more than twice as great when operating synchronously as when it is operating asynchronously, the numbers of poles being the same under both conditions of operation.

Having thus described my invention and embodiments thereof and their modes of operation, I claim:

1. In an electric motor, a stator and a motor, groups of windings in the stator and rotor arranged when energized by a source of polyphase power to produce rotating fields about the axes thereof and means connected with said groups for causing the rotor and stator to effect simultaneously either one or the other of two equal numbers of pairs of rotating magnetic poles in the ratio of two to one; means for simultaneously connecting the stator to a source of polyphase power and to effect therein the smaller number of poles and for connecting the rotor on itself only to have the smaller number of poles, whereby the motor starts from zero speed and runs up to a maximum speed less than synchronous speed; means for simultaneously reconnecting the stator and rotor to effect therein the larger number of poles and means for at the same time opening the rotor circuit and reconnecting it to the source of power so that the magnetic poles of the rotor rotate in the rotor in a direction against the direction of rotation of the poles of the stator, whereby the rotor is accelerated to and maintained at the synchronous speed of the stator field.

2. An alternating current polyphase motor comprising, in combination: a stator winding with terminals so constructed and connected that upon energization of the winding by polyphase currents applied to certain of the terminals a rotating magnetic field having a certain number of magnetic poles is produced by said winding, and upon applying the polyphase currents to the others of said terminals a rotating magnetic field having twice said certain number of magnetic poles is produced by said winding; a rotor winding with rotor terminals so constructed and connected that upon connecting certain of said rotor terminals together the rotor winding is thereby connected to provide a number of magnetic poles equal to said certain number of magnetic poles of said stator and upon applying the polyphase currents to the others of said rotor terminals a rotating magnetic field having twice said certain number of magnetic poles is produced by said rotor winding; a source of polyphase current; switching means for simultaneously connecting the source of polyphase current to the stator winding to cause the production thereby of a rotating field having the said certain number of magnetic poles and for connecting the certain rotor terminals together to provide a number of magnetic poles equal to said certain number whereby the rotor accelerates as a wound rotor induction motor to a maximum speed less than that of the rotating field of the stator winding; and further switching means for thereafter concurrently connecting the source of polyphase currents to the other stator terminals to cause the production in said stator winding of a rotating field of a certain rotary sense about the stator axis having twice the said certain number of magnetic poles, and for connecting the source of polyphase currents to the said other rotor winding terminals to cause the production by said rotor winding of a magnetic rotating field also having twice the said certain number of magnetic poles with the direction of rotation in a rotary sense about the rotor axis opposite to the rotary sense of the stator field about its axis whereby the rotor is further accelerated to a speed exactly determined by the added rates of rotation of said rotating fields.

3. An electric motor for starting as an induction motor to provide high torque for starting from rest and for running the rotor after it has reached the required running speed at a constant speed irrespective of variations in torque required to run the load at such speed, said motor comprising in combination: a stationary winding having groups of coils connected and arranged for jointly producing first the effect of a rotating magnetic field having a certain fixed speed of rotation in one direction or rotation and second the effect of such a field having one-half the speed in the same direction of rotation produced in the first effect, and means for initiating the change from the first effect to the second effect while the first effect is being produced; a rotatable winding having groups of coils connected and arranged for jointly experiencing magnetic induction by the first effect to cause rotation of the rotatable winding from zero speed to a speed slightly less than the speed of field rotation in the first effect, and means for changing the connections of the groups of coils of the rotating winding at the same time as the change from the first to the second effect occurs so that a rotating magnetic field of like speed to that of the second effect is independently produced in the rotatable winding, but having a direction of rotation with respect to the rotatable winding which is opposite to the direction of rotation of the winding itself at the time of initiating the change of connections.

4. An electric motor for starting as an induction motor to provide high torque for starting from rest and for running the rotor after it has reached the required running speed at a constant speed irrespective of variations in torque required to run load at such speed, said motor comprising in combination: a first winding having groups of coils connected and arranged for jointly producing first the effect of a rotating magnetic field having a certain fixed speed of rotation in one direction of rotation and second the effect of such a field having one-half the speed in the same direction of rotation produce in the first effect, and means for initiating the change from the first effect to the second effect while the first effect is being produced, a second winding having groups of coils connected and arranged for jointly experiencing magnetic induction by the first effect to cause relative rotation of the second winding from zero speed up to a speed slightly less than the speed of field rotation in the first effect, and means for changing the connections of the groups of coils of the second winding at the same time as the change from the first to the second effect occurs so that a rotating magnetic field of like speed to that of the second effect is independently produced in the second winding, but such magnetic field having a direction of rotation with respect to the second winding which is opposite to the direction of rotation of the winding itself at the time of initiating the change of connections but rotating locked in with the rotating magnetic field in the second effect.

5. In an electric motor, a stator and a rotor, groups of windings in the stator and rotor arranged when energized by a source of power to produce rotating fields about the axes thereof and means connected with said groups for causing the rotor and stator to effect simultaneously either one or the other of two equal numbers of pairs of rotating magnetic poles in the ratio of two to one; means for simultaneously connecting the stator to a source of power to effect therein the smaller number of poles and for connecting the rotor on itself only to have the smaller number of poles, whereby the motor starts from zero speed and runs up to a maximum speed less than synchronous speed; means for simultaneously reconnecting the stator and rotor to effect therein the larger number of poles and means for at the same time opening the rotor circuit and reconnecting it to the source of power so that the magnetic poles of the rotor rotate in the rotor in a direction against the direction of rotation of the poles of the stator, whereby the rotor is accelerated to and maintained at the synchronous speed of the stator field multiplied by two.

6. In an electric motor, a stator and a rotor, groups of windings in the stator and rotor arranged when energized by a source of power to produce rotating fields about the axes thereof and means connected with said groups for causing the rotor and stator to effect simultaneously either one or the other of two equal numbers of pairs of rotating magnetic poles in a ratio greater than unity; means for simultaneously connecting the stator to a source of power to effect therein the smaller number of poles and for connecting the rotor on itself only to have the smaller number of poles, whereby the motor starts from zero speed and runs to a maximum asynchronous speed; means for simultaneously reconnecting the stator and rotor to effect therein the larger number of poles and means for at the same time opening the rotor circuit and reconnecting it to the source of power so that the magnetic poles of the rotor rotate in the rotor in a direction against the direction of rotation of the poles of the stator, whereby the rotor is accelerated to and maintained at the synchronous speed of the stator field multiplied by two.

7. An alternating current polyphase motor comprising, in combination: a stator winding wound and provided with taps and terminals for either salient pole operation only or for combined salient pole and consequent pole operation so that upon energization of the winding by polyphase currents applied to certain of the terminals a rotating magnetic field having a certain number of salient magnetic poles is produced by said winding half of which are of one polarity and the other half of which are of the opposite polarity, and upon applying the polyphase currents to the others of said terminals a rotating magnetic field having the same certain number of salient magnetic poles but all of which are of the same polarity and consequently having also the said certain number of consequent magnetic poles each disposed between adjacent salient poles and all being of opposite polarity to that of the salient poles is produced; a rotor winding wound and provides with taps and terminals for operation as a closed circuited rotor winding with the said certain number of poles and also wound and provided with other taps and terminals for operation as a directly energized winding producing a number of salient poles equal to said certain number all of the same polarity and consequently an equal number of consequent poles between adjacent salient poles of opposite polarity to the salient poles; a source of polyphase current; switching means for simultaneously connecting the source of polyphase current to the stator winding to cause the production thereby of a rotating field having only the said certain number of salient magnetic poles half of which are of one polarity and the other half of which are of the other polarity and for connecting the rotor winding for operation as a closed circuited rotor winding, whereby the rotor accelerates as a wound rotor induction motor to a maximum speed less than that of the then rotating field of the stator winding; and further switching means for thereupon connecting the source of polyphase currents to the other stator and rotor terminals for said salient and consequent pole operation with the direction of rotation of the rotor field in a rotary sense about the rotor axis opposite to the rotary sense of the stator field rotation about its axis, whereby the rotor is further accelerated to a speed exactly determined by the added rates of rotation of said rotating fields.

8. A motor according to claim 7, the switching means including means responsive to the motion of the motor to effect the change from salient pole operation only to salient pole and consequent pole operation.

9. A motor according to claim 7, the switching means including motor operated switches mounted on the rotor to effect the change from salient pole operation only to salient pole and consequent pole operation.

10. A motor according to claim 7, the switching means including: a plural contact switch associated with the stator winding terminals adapted to connect it with the source for either salient pole or consequent pole operation and having a solenoid for operating it, switches associated with the rotor winding adapted to connect the rotor winding to the source to cause current to flow directly from said source therethrough, and said solenoid being connected for energization in response to said current to effect operation of the plural contact switch.

11. A motor according to claim 7, said rotor comprising a number of slip rings only equal to the number of phases of the source, and the switching means and winding terminals for effecting the changes in said rotor winding connections being mounted on the rotor.

12. A motor according to claim 7, said rotor comprising a number of slip rings only equal to the number of phases of the source, and the terminals and switching means for effecting the changes in rotor winding connections being mounted on said rotor, said switching means including centrifugally operated switches responsive to the speed of the rotor to effect the change of connections.

References Cited in the file of this patent

UNITED STATES PATENTS

| Number | Name | Date |
|---|---|---|
| 775,537 | Meissner | Nov. 22, 1904 |
| 856,477 | Lamme | June 11, 1907 |
| 871,513 | Lohr | Nov. 19, 1907 |
| 971,056 | Lohr | Sept. 27, 1910 |
| 1,204,169 | Lohr | Nov. 7, 1916 |
| 1,227,815 | Meyer | May 29, 1917 |
| 1,296,487 | Dudley | Mar. 4, 1919 |
| 1,506,446 | Rogers | Aug. 26, 1924 |
| 2,061,983 | Rossman | Nov. 24, 1936 |
| 2,084,178 | Angst | June 15, 1937 |